United States Patent Office 2,744,935
Patented May 8, 1956

2,744,935

PROCESS FOR THE MANUFACTURE OF HYDRAZOBENZENES

Hans Johner, Basel, Switzerland, assignor to Ciba Limited, Basel, Switzerland, a Swiss firm No Drawing. Application December 15, 1952, Serial No. 326,131

Claims priority, application Switzerland December 17, 1951

11 Claims. (Cl. 260—569)

It is known that benzidine as well as some of its homologues and substitution products, which are required as intermediates in the manufacture of dyestuffs, are prepared from the corresponding hydrazobenzenes by means of the so-called "benzidine rearrangement." This rearrangement generally does not present any particular difficulties except the formation of about 5 to 15 per cent. of diphenyline which is regarded as unavoidable.

However, there is still a real need for an improved, namely cheaper, process for preparing hydrazobenzenes. It is known that hydrazobenezenes may be obtained by reduction of nitrobenzenes in an alkaline medium, if desired in one step. This reaction is troublesome to carry out if a comparatively cheap reducing agent, such as iron, is used (compare Fierz, Grundlegende Operationen, 4th edition, page 82) and reliable processes could be worked out only by using expensive reducing agents, such as zinc dust or electric energy (electrolytic reduction).

The difficulties arising when nitrobenzene is intended to be reduced to hydrazobenzene by means of iron as reducing agent are manifold. Experience has shown that many brands of iron are not suited at all for the reduction referred to or are at the most only of very limited utility and it was not possible hitherto to discern the useful brands from the useless ones by means of a chemical or physical property. Furthermore, difficulties are encountered especially in large scale manufacture because a large amount of iron in excess of the theoretical quantity is required. During the reaction, such iron compounds are mostly formed as lead to an almost concrete-like cementing of the reaction mixture, and blocking of the stirring mechanism is the result. Means for effectively overcoming this cementing action are not known. Besides this, there is the risk of hydrogen evolution; especially with difficultly stirrable reaction mixtures hydrogen may lead to explosions. It is a fact at any rate that none of the important firms engaged in the manufacture of benzidine make use of the long-known process involving iron as reducing agent, but are using zinc dust or electric energy as means for effecting the reduction.

The present invention provides surprisingly simple means for overcoming the difficulties previously connected with the iron-reduction process, whereby at the same time considerably better yields are obtained in a reliable way. Finally, the chemical properties are defined which the iron must have to be suitable for the instant process.

The present invention is based on the observation that hydrazobenzenes can be produced by alkaline reduction of nitrobenzenes, or of products occupying an intermediate stage between nitrobenzene and hydrazobenzene, by using iron as reducing agent if the quantity of alkali hydroxide necessary for achieving the alkaline reaction of the mixture is at least about 1 mol for every reduction equivalent required.

As starting materials that may be used in the present process nitrobenzene itself may be mentioned as well as its simple substitution products free from solubilizing groups, such as ortho-nitrotoluene or ortho-nitroanisol. As products occupying an intermediate stage there come into consideration azo and azoxy compounds which may be obtained in any desired way, for example by direct alkaline reduction of nitro compounds by means of methanol.

The iron used as reducing agent in the present invention should fulfill the condition that it contains at least iron carbide as alloy constituent and may furthermore contain iron silicium compounds as well. This condition is almost always fulfilled with commercial cast iron. Iron-silicium compounds mostly occur along with iron carbides. For the purposes of the present invention it is desirable that the percentage of such compounds be greater than about 1 per cent., preferably 2 or more per cent. This, on the one hand, leads to a smooth course of the reaction and, on the other hand, reduces the amount of iron required for the reduction. It may of course be assumed that such kinds of iron, especially cast iron, have been considered and even used in reductions of the kind referred to. However, it was unknown prior to the present invention which are the alloy constituents that are critical for obtaining a smooth reaction and good yields.

The essential new feature of the present invention, however, is the use of a considerably greater amount of alkali hydroxide for effecting the reduction by means of iron than was usual hitherto. It is not the greater amount of liquid, but the actual alkali hydroxide content which, irrespective or to a large extent irrespective of the total amount of liquid, is responsible for the essential difference between the old and the new procedures. It is important that for every hydrogen atom theoretically required for carrying out the reduction (here called reduction equivalent) at least about 1 mol of alkali hydroxide is used for making up the reaction mixture. It seems that under these conditions the iron-silicium and especially the iron carbide reacts according to the equation.

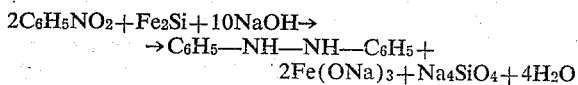

or according to the equation

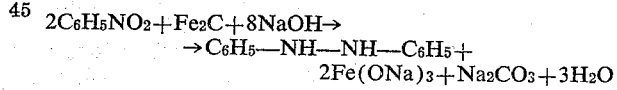

respectively. If, for example, azobenzene is subjected to reduction the respective compounds probably react according to the equation

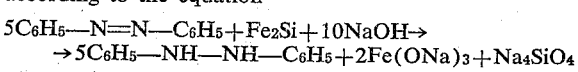

or the equation

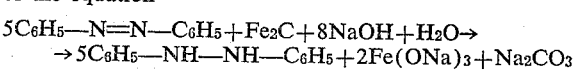

This means that both silicium or carbon and iron chemically combined therewith act as reducing agents, whereas the remainder of the iron is scarcely relevant for the reduction.

From the above equations it appears that as it is generally known a great excess of iron is required because that part of the iron only which is chemically combined with silicium or carbon, respectively, or substantially that part of the iron only, is reactive, whereas at least a great part of the free iron present in the alloy does not take part in the reaction.

The conditions of the reaction may otherwise be chosen such as are usual in reduction processes of the kind referred to. It is convenient to start the reaction at a temperature considerably below 100° C. and at such temperatures possibly an intermediate compound is first formed which contains iron in organic combination. For bringing the reaction to an end, the temperature may conveniently be raised, for example to 90° C. or higher. Thus for example a temperature between 50° C. and 100° C. may be chosen for beginning, and of 80° C. to 150° C. for finishing the reaction.

In view of the fact that reduction processes carried out in an acid medium with iron as reducing agent, for example the reduction of nitrobenzene to yield aniline, or of numerous other nitrobenzene compounds are carried out in such a way that the amount of acid used is by far below the reduction equivalent, it could by no means be foreseen that just in connection with the present alkaline reaction the amount of alkali should be chosen in an essentially different way, namely much higher and depending on the reduction equivalent required.

The following examples illustrate the present invention without limiting it in any way. The parts, unless otherwise stated, are parts by weight, the percentage is given by weight and the temperatures are indicated in degrees centigrade. The ratio of the parts by volume to the parts by weight is the same as that between the liter and the kilogram.

Example 1

In a crucible of iron, nickel or porcelain, 120 parts of iron powder containing about 2.5 per cent. of carbon, mainly as iron carbide, and no appreciable amount of other alloy constituents are stirred in a solution of 60 parts of sodium hydroxide in 40 parts of water which has assumed a temperature of about 50° to 70° during the dissolving treatment. A well stirrable suspension is obtained, and it is kept at about 70°.

Furthermore, 150 parts of sodium hydroxide are dissolved in 70 parts of water in a cast iron vessel provided with a cast iron stirrer; then 300 parts by volume of solvent naphtha and 123 parts of nitrobenzene are added. After about ½ hour's stirring at 50-70° the iron-sodium hydroxide paste described in the preceding paragraph is added thereto within about ½ to 1 hour and stirring is continued for a further hour at about 50-60°. Then the temperature of the mixture is raised to about 120° within about ½ hour and kept at this temperature with continuous stirring. After ½ hour 10 parts of iron (see above) are added and stirring is continued for a further ½ hour. This addition is repeated until the layer of solvent naphtha becomes practically colorless and a sample thereof deposits appreciable amounts of hydrazobenzene on cooling. If an active brand of iron powder is used this result will be achieved after about three additions of 10 parts of iron each, and after about 2 hours. Then the solution is decanted or otherwise separated from the iron paste (if necessary by means of a filter), the iron paste is washed several times with small portions of hot solvent naphtha with stirring of the paste. A solution of hydrazobenzene is thus obtained which may be worked up to yield solid hydrazobenzene by cooling and crystallizing, or which may be worked up to yield benzidine by cooling down to 10-20° and adding about 100 parts of ice and 100 parts by volume of concentrated hydrochloric acid. The yield is about 80-85 parts of hydrazobenzene or 75 to 80 parts of benzidine.

Example 2

In a cast iron vessel provided with a stirrer 170 parts of sodium hydroxide are stirred with 130 parts of water and 200 parts of iron containing about 2 per cent. of carbon as carbide and which is substantially free from other constituents (say less than 0.01 percent. of silicium) are added. After ½ hour's stirring at 70°, 600 parts of chlorobenzene and 424 parts of azotoluene (pure, crystalline, melting point 53-55°) are added. The temperature drops to about 50°. Stirring is continued for 1 hour at 50-55°, then the temperature is raised within ½ hour to 95-100°. Each hour thereafter 20 parts of iron powder (see above) are added until the solution is substantially colorless and a sample thereof on cooling deposits crystals of hydrazotoluene. Depending on the iron used one or more further additions are required. After the decoloration of the solution stirring is still continued for several hours preferably overnight at about 90-100°. Then the solution is separated from the iron sludge, the latter is washed several times with a small quantity of hot chlorobenzene. A solution is obtained which contains about 400 parts of hydrazotoluene, which may be recovered by crystallizing or may be transformed into tolidine by cooling down and by addition of hydrochloric acid in known manner.

In an analogous way from 484 parts of azoanisol a solution of 460 parts of hydrazoanisol is obtained which may be transformed in known manner into dianisidine by means of hydrochloric acid.

Example 3

A solution of 198 parts of azoxy benzene (either pure, crystalline or a commercial product containing small amounts of nitrobenzene or azobenzene), in 300 parts of chlorobenzene is added to an iron paste obtained by stirring 160 parts of an iron powder containing about 2 per cent. of carbon and 2.5 per cent. of silicium (which may constitute the finest part of a cast iron powder removed by suitable sieving) in a solution of 170 parts of sodium hydroxide in 120 parts of water. The whole is stirred at 50-55° for about one hour, then the temperature is raised to 100-110° with continuous stirring until a sample shows substantial decoloration and deposits an appreciable amount of hydrazobenzene on cooling. The whole mixture is then worked up as described in Example 1.

It is to be remarked that the addition of an organic solvent to the reaction mixture as indicated in the examples above, such as chlorobenzene or solvent naphtha is not critical for maintaining the reaction mixture in a stirrable condition. If the amount of alkali hydroxide is chosen in accordance with the prior art substantially below the reduction equivalent even a great amount of an organic solvent does not lead to the desired result, whereas according to the present invention the addition of an organic solvent is not necessary for keeping the reaction mixture in a stirrable condition, but only functions as a convenient means for taking up the hydrazobenzene formed and for separating the latter from the iron sludge. Therefore the choice of a particular solvent is not critical and other indifferent solvents may be used as well, such as ortho-dichlorobenzene, trichlorobenzene, 1-chloronaphthalene and dekahydronaphthalene.

What is claimed is:

1. In a process for the preparation of a hydrazobenzene by alkaline reduction of a compound selected from the group consisting of nitrobenzene, 2-methyl-1-nitrobenzene and 2-methoxy 1-nitrobenzene and the corresponding azoxy and azo compounds, the improvement which comprises carrying out the reduction by means of metallic iron containing an oxygen-free iron compound of at least one of the elements silicon and carbon, and adding to the reaction mixture at least about one mol of alkali hydroxide for each reduction equivalent required.

2. In a process for the preparation of a hydrazobenzene by alkaline reduction of a compound selected from the group consisting of nitrobenzene, 2-methyl-1-nitrobenzene and 2-methoxy 1-nitrobenzene and the corresponding azoxy and azo compounds, the improvement which comprises carrying out the reduction by means of metallic iron containing an oxygen-free iron compound of carbon, and adding to the reaction mixture at least about one mol of alkali hydroxide for each reduction equivalent required.

3. In a process for the preparation of a hydrazobenzene by alkaline reduction of a compound selected from the group consisting of nitrobenzene, 2-methyl-1-nitrobenzene and 2-methoxy 1-nitrobenzene and the corresponding azoxy and azo compounds, the improvement which comprises carrying out the reduction by means of metallic iron containing oxygen-free iron compounds of carbon and oxygen-free iron compounds of silicon, and adding to the reaction mixture at least about one mol of alkali hydroxide for each reduction equivalent required.

4. In a process for the preparation of hydrazobenzene by alkaline reduction of azo benzene, the improvement which comprises carrying out the reduction by means of metallic iron containing an oxygen-free iron compound of at least one of the elements silicon and carbon, and adding to the reaction mixture at least about one mol of alkali hydroxide for each reduction equivalent required.

5. In a process for the preparation of 2:2'-dimethyl-hydrazobenzene by alkaline reduction of 2:2'-dimethyl-azobenzene, the improvement which comprises carrying out the reduction by means of metallic iron containing an oxygen-free iron compound of at least one of the elements silicon and carbon, and adding to the reaction mixture at least about one mol of alkali hydroxide for each reduction equivalent required.

6. In a process for the preparation of 2:2'-dimethoxy hydrazobenzene by alkaline reduction of 2:2'-dimethoxy-azobenzene, the improvement which comprises carrying out the reduction by means of metallic iron containing an oxygen-free iron compound of at least one of the elements silicon and carbon, and adding to the reaction mixture at least about one mol of alkali hydroxide for each reduction equivalent required.

7. A process for the preparation of a hydrazobenzene, which comprises reducing a compound selected from the group consisting of nitrobenzene, 2-methyl-1-nitrobenzene and 2-methoxy 1-nitrobenzene and the corresponding azoxy and azo compounds in a reaction mixture containing as reducing agent metallic iron with a content of an oxygen-free compound of at least one of the elements carbon and silicon, the said reaction mixture further containing at least about one mol of alkali hydroxide for each reduction equivalent required.

8. In a process for the preparation of hydrazobenzene by alkaline reduction of nitrobenzene, the improvement which comprises carrying out the reduction of the nitrobenzene by means of metallic iron containing an oxygen-free iron compound of at least one of the elements silicon and carbon, and adding to the reaction mixture at least about one mol of alkali hydroxide for each reduction equivalent required.

9. In a process for the preparation of hydrazobenzene by alkaline reduction of nitrobenzene, the improvement which comprises carrying out the reduction of the nitrobenzene by means of metallic iron containing an oxygen-free iron compound of carbon, and adding to the reaction mixture at least about one mol of alkali hydroxide for each reduction equivalent required.

10. In a process for the preparation of hydrazobenzene by alkaline reduction of nitrobenzene, the improvement which comprises carrying out the reduction of the nitrobenzene by means of metallic iron containing oxygen-free iron compounds of carbon and oxygen-free iron compounds of silicon, and adding to the reaction mixture at least about one mol of alkali hydroxide for each reduction equivalent required.

11. A process for the preparation of hydrazobenzene which comprises reducing nitrobenzene in a reaction mixture containing as reducing agent metallic iron with a content of an oxygen-free compound of at least one of the elements carbon and silicon, the said reaction mixture further containing at least one mol of alkali hydroxide for each reduction equivalent required.

References Cited in the file of this patent

UNITED STATES PATENTS

| 2,010,067 | Dreyfus | Aug. 6, 1935 |
| 2,175,244 | Bowlus | Oct. 10, 1939 |

FOREIGN PATENTS

| 15,706 | Great Britain | Sept. 21, 1901 |
| 269,677 | Great Britain | Jan. 23, 1926 |
| 441,179 | Germany | Feb. 26, 1921 |

OTHER REFERENCES

Thorpe: "Dictionary of Applied Chem." vol III, pp. 669–77 (1922).